(12) United States Patent
Frank

(10) Patent No.: US 6,921,992 B2
(45) Date of Patent: Jul. 26, 2005

(54) MACHINE WITH A SUPERCONDUCTING WINDING ARRANGED IN A WINDING CARRIER AND MEANS FOR HOLDING SAID WINDING CARRIER

(75) Inventor: Michael Frank, Uttenreuth (DE)

(73) Assignee: Siemens Aktiengesellschaft, Munich (DE)

(*) Notice: Subject to any disclaimer, the term of this patent is extended or adjusted under 35 U.S.C. 154(b) by 36 days.

(21) Appl. No.: 10/467,834

(22) PCT Filed: Jan. 30, 2002

(86) PCT No.: PCT/DE02/00325

§ 371 (c)(1),
(2), (4) Date: Aug. 13, 2003

(87) PCT Pub. No.: WO02/065625

PCT Pub. Date: Aug. 22, 2002

(65) Prior Publication Data

US 2004/0061389 A1 Apr. 1, 2004

(30) Foreign Application Priority Data

Feb. 13, 2001 (JP) .......................................... 101 06 552

(51) Int. Cl.[7] .................................................. H02K 9/00
(52) U.S. Cl. .......................................... 310/52; 310/61
(58) Field of Search .............................. 310/52, 58, 61, 310/261

(56) References Cited

U.S. PATENT DOCUMENTS

| | | | |
|---|---|---|---|
| 3,742,265 A | 6/1973 | Smith, Jr. .................... 310/52 |
| 3,942,053 A | * 3/1976 | Abolins et al. ................ 310/52 |
| 4,017,755 A | 4/1977 | Litz .............................. 310/52 |
| 4,101,793 A | * 7/1978 | Berthet et al. ................. 310/52 |
| 4,126,798 A | * 11/1978 | Carr et al. ................... 310/204 |
| 4,184,089 A | * 1/1980 | Sterrett et al. ................. 310/52 |
| 4,239,999 A | 12/1980 | Vinokurov et al. ........... 310/10 |
| 4,532,445 A | 7/1985 | Iwamoto et al. ............... 310/52 |
| 6,489,700 B1 | * 12/2002 | Heiberger et al. .......... 310/178 |

FOREIGN PATENT DOCUMENTS

| | | | |
|---|---|---|---|
| DE | 2 325 707 | 12/1973 | ............. H02K/3/02 |
| DE | 2 326 016 | 12/1973 | |
| DE | 27 17 580 | 12/1977 | ............. H02K/1/32 |
| DE | 27 53 461 | 6/1978 | ............. H02K/9/00 |

OTHER PUBLICATIONS

Bogner et al., "Electrical Machines with Superconductors", Siemens Research and Development Reports, vol. 5, No. 1, 1976, pp. 10–16.

* cited by examiner

*Primary Examiner*—Darren Schuberg
*Assistant Examiner*—Nguyen Hanh
(74) *Attorney, Agent, or Firm*—Staas & Halsey LLP

(57) ABSTRACT

The machine included a rotor which is rotatably arranged about an axis of rotation with a superconducting winding in a winding carrier. In order to hold the winding carrier inside the outer housing of the rotor, a fixing device which extends axially on one-side is provided on the torque-transmitting side of the rotor. The fixing device can be at least partially made of a fiber-reinforced plastic.

6 Claims, 2 Drawing Sheets

MACHINE WITH A SUPERCONDUCTING WINDING ARRANGED IN A WINDING CARRIER AND MEANS FOR HOLDING SAID WINDING CARRIER

CROSS REFERENCE TO RELATED APPLICATIONS

This application is based on and hereby claims priority to German Application No. 10106552.3 filed on Feb. 13, 2001, the contents of which are hereby incorporated by reference.

BACKGROUND OF THE INVENTION

1. Field of the Invention

The invention relates to a machine having a rotor which is mounted such that it can rotate about a rotation axis, and which has a hot rotor outer housing which is attached to axial rotor shaft parts and has a superconducting winding which surrounds a cold winding former. The winding former is held within the rotor outer housing by a structure formed at one end of the rotor to transmit a torque between the winding former and the associated rotor shaft part. Also provided is cooling and thermal insulation of the superconducting winding. A corresponding machine is disclosed in DE 23 26 016 B2.

2. Description of the Related Art

Electrical machines, in particular generators or motors, generally have a rotating field winding and a stationary stator winding. In this case, the current density and hence the specific rating of the machine, that is to say the volt-amperes per kilogram of its own weight, can be increased, and the efficiency of the machine can be improved as well by the use of cryogenic and, in particular, superconducting conductors.

Cryogenic windings for electrical machines generally need to be thermally insulated from the environment and to be kept at the required low temperature by a cooling system. Effective thermal insulation can in this case be achieved only if the cryogenic parts of the machine are separated to as great an extent as possible from the hot outer area by hard vacuum with a residual gas pressure of in general less than 10-3 mbar and if the connecting parts between these cryogenic parts and the hot outer area transmit as little heat as possible.

Two variants in particular are known for vacuum insulation of rotors with cryogenic rotor windings and hot stator windings: In a first embodiment, the rotor has a hot outer housing and a closed vacuum area which rotates with it. The vacuum area should in this case surround the cryogenic area on all sides (see, for example, "Siemens Forsch. u. Entwickl.-Ber", Volume 5, 1976, No. 1, pages 10 to 16). However, heat is transmitted in an undesirable manner to the cryogenic parts via supports which extend through the vacuum area. In a second embodiment, the essentially cold rotor rotates in a hard vacuum. In this case, the outer boundary of the hard vacuum area is defined by the internal hole in the stator. However, an arrangement such as this requires shaft seals which are proof against the hard vacuum, between the rotor and the stator (see, for example, DE 27 53 461 A1).

The first-mentioned embodiment is implemented in the machine that is described in the DE 23 26 016 B2 document cited initially. The superconducting winding on its rotor is located in the interior of a rotor cryostat which, together with closed shafts that are fitted, forms an outer housing for the rotor. Owing to the use of traditional superconductor material for the conductors of the winding, helium cooling is provided, with an operating temperature of around 4 K. In contrast, the outer contour of the rotor outer housing is at approximately room temperature, and even above this temperature during operation. The useful torque of the machine is produced in the rotor winding. This rotor winding is arranged in a cold winding former, which is itself suspended or held in an insulated manner in the rotor outer housing which acts as a cryostat. In this case, this suspension or retention on the drive end of the rotor must be sufficiently stable to transmit the torque from the cold winding former to a shaft part on the drive end. An appropriate, rigid connecting device for torque transmission must therefore be designed in a relatively solid form, and must be connected to the winding former and to the drive-end shaft part such that power can be transmitted. At the same time, this connecting device provides the drive-end centering for the cold winding former. Virtually no torque is emitted at the opposite rotor end, which is also referred to as the non-drive or operating end because important connections such as a coolant supply are provided on it for operation of the machine. Thus, only the functions of centering and thermal insulation need essentially be carried out here. Since, however, with the transition from room temperature to the operating temperature, the axial length of the winding former is reduced by at least a few millimeters relative to the corresponding extent of the rotor outer housing, the operating-end suspension also has to carry out the function of appropriate length compensation. In the machine which is disclosed in the initially cited DE 23 26 016 B2 document, radially running connecting elements in the form of disks are therefore provided between the rotor outer housing and the winding former and allow appropriate bending in the axial direction, for expansion compensation. Heat is also introduced via these connecting elements into the cryogenic area of the winding former.

In a further rotor, which is disclosed in DE 27 17 580 A1, for an electrical machine having a superconducting field winding, a corresponding radially extending connecting element is provided between a rotor outer housing and a winding former which, although it allows axial deformation, leads, however, to undesirable introduction of heat into the cryogenic area of the machine.

In addition to metallic superconductor materials such as NbTi or Nb3Sn which have been known for a long time and as are used in the machines mentioned above, metal-oxide superconducting materials have also been known since 1987, and have critical temperatures above 77 K. Attempts have been made to produce superconducting windings for machines based on conductors using such high-$T_c$ superconductor materials, which are also referred to as HTS materials. Even machines with this conductor type require appropriate expansion compensation in the axial direction due to the temperature differences between the operating temperature of the superconductor material and the external temperature of the hotter rotor outer housing.

SUMMARY OF THE INVENTION

An object of the present invention is to specify a holding apparatus for the winding former for a machine having the features as mentioned initially, which holding structure allows such axial expansion compensation (length compensation) for the winding former in a relatively simple manner and, in the process, in particular limits the losses resulting from the introduction of heat into the superconducting winding.

Accordingly, the aim for a machine having the features as mentioned initially is to provide for the holding structure for this machine to be formed at that end of the rotor which transmits torque as a singe-ended, axially extending (in the direction parallel to the rotor axis, or parallel to the axis) attachment apparatus of the winding former within the rotor outer housing. In this context, the expression attachment apparatus means a holding structure which ensures not only mechanically robust retention and centering of the winding former within the rotor outer housing, but also torque transmission not only during normal operation but also in the event of an overload with comparatively higher torques, for example during start up or in the event of various disturbances to the machine.

The advantages which are associated with this refinement of the invention are that it can be manufactured easily and at low cost, it provides centering and at the same time limits the heat leakage that needs to be withstood. In this case, there is no longer any need for special measures for shrinkage compensation (=axial movement) of the winding former. This is because the invention is based on the knowledge that, if the machine is not suspended at both ends as in the prior art, it is possible to avoid shrinkage problems. This is because the single-ended suspension (in the sense of rigid attachment irrespective of the alignment of the rotor axis) means that thermal shrinkage of the winding former does not result in any stresses between the cooler inner parts and the hotter outer parts of the rotor. The remaining single-ended suspension must, of course, be designed to be appropriately mechanically strong. However, this is generally not a problem for motors and generators. This is because the fact that the torque of the machine must be transmitted through this suspension means that the attachment apparatus at the drive end of the machine is intrinsically designed to be sufficiently solid for this purpose from the start.

The axially extending attachment apparatus can thus have a hollow cylindrical shape. Good centering of the winding former via this apparatus with a material cross section which is at the same time small and which limits the losses caused by the introduction of heat can thus be achieved.

At least a part of the axially extending attachment apparatus is preferably formed from a plastic material which is reinforced with fibers. Sufficient mechanical robustness with an advantageously small amount of heat being transmitted can be ensured by the use of appropriate materials.

Metallic low-$T_c$ superconductor material or, in particular, metal-oxide high-$T_c$ superconductor material may be used for the conductors of the superconducting winding for the machine.

The rotation axis of the machine according to the invention normally extends in the horizontal direction. However, if required, particularly with regard to any unbalance problems, it is also possible to arrange the machine with the rotation axis of its rotor aligned vertically.

BRIEF DESCRIPTION OF THE DRAWINGS

These and other objects and advantages of the present invention will become more apparent and more readily appreciated from the following description of one preferred exemplary embodiment, taken in conjunction with the accompanying drawing.

DETAILED DESCRIPTION OF THE PREFERRED EMBODIMENT

Figure 1:
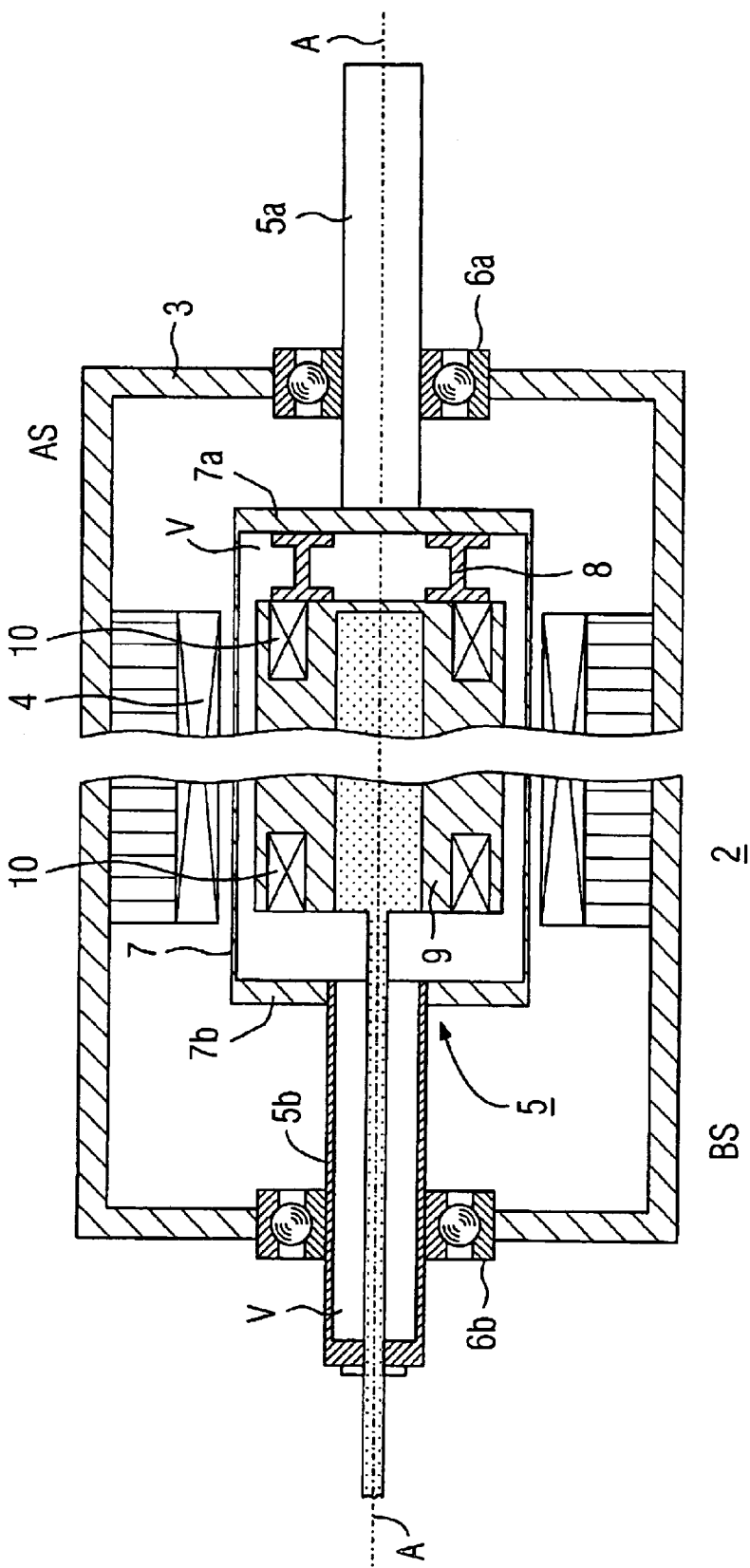
FIG. 1 is a partial cross sectional view of one possible embodiment of the machine, schematically, in the form of a longitudinal section

Reference will now be made in detail to the preferred embodiments of the present invention, examples of which are illustrated in the accompanying drawings, wherein like reference numerals refer to like elements throughout.

The machine as described in the following text may in particular be a synchronous motor or a generator. Other fields of application or use for corresponding machines, for example for high speeds, compact drives, for example for ships and for what are referred to as offshore facilities such as drilling platforms are also, of course, feasible. The machine according to the invention has a rotating superconducting winding, which in principle allows the use of metallic LTS material (low-$T_c$ superconductor material) or, in particular, oxidic HTS material (high-$T_c$ superconductor material). It is assumed that the latter material has been chosen for the following exemplary embodiment. The winding may comprise one coil or a system of coils arranged with two poles, four poles, or any other number of poles. The basic structure of a synchronous machine such as this is based on FIG. 1, on the assumption of known embodiments of machines such as these (see, for example, the references cited above).

The machine, which is annotated 2 overall, has a stationary machine outer housing 3, which is at room temperature and has a stator winding 4. Within this outer housing and surrounded by the stator winding 4, a rotor 5 is mounted in bearings 6a and 6b such that it can rotate about a rotation axis A. For this purpose, the rotor has a rotor outer housing 7 which is in the form of a vacuum vessel and in which a winding former 9 having an HTS winding 10 is held at one end according to the invention. This is done at the drive end AS by a rigid, tubular attachment apparatus 8 between the winding former 9 and an end part 7a, which is in the form of a disk and is firmly connected to the rotor shaft part 5a, of the rotor outer housing. The torque is also transmitted via this rigid, axially extending (that is to say parallel to the rotation axis A) attachment apparatus 8. This attachment device is advantageously formed from a hollow cylinder which conducts heat poorly and is formed from a plastic material (referred to as a GFC material) which is reinforced with fibers, for example glass fibers, or is formed from some other fiber-reinforced material. In this case, the fibers are placed in a manner known per se into the plastic material, which is used as a matrix and is chosen on the basis of strength considerations. This composite material then ensures sufficient mechanical stiffness for torque transmission, and a high shear modulus (G modulus) with low thermal conductivity at the same time.

According to the invention, no corresponding attachment apparatus is provided at the non-drive end, which is opposite the drive end AS and is referred to in the following text by the letters BS. This means that the winding former 9 is held and centered exclusively by the attachment apparatus 8.

Connecting elements may, of course, be provided at the end BS remote from the drive, between the winding former 9 and the rotor outer housing 7 or its housing wall 7b. However, these connecting elements contribute virtually nothing to the retention and centering of the winding former but are provided, for example, for the electrical and/or cooling connection of the superconducting winding. A corresponding cooling connection is indicated in FIG. 1. A coolant supply for cooling the superconducting winding 10 from outside the machine is, inter alia, accordingly provided at the end BS which is remote from the drive via the hollow-cylindrical shaft part 5b which is mounted in the bearing 6b. Details of the coolant supply and of the sealing are generally known. FIG. 1 therefore does not illustrate this in detail. It is, of course, also possible to integrate an appropriate coolant supply in the drive-end shaft part 5a.

A vacuum which for reasons of thermal insulation surrounds the winding former 9 together with the superconducting winding 10 in at least one vacuum area is annotated by V in FIG. 1. Further thermally insulating measures may also be provided, of course, in particular such as super insulation.

Figure 2:
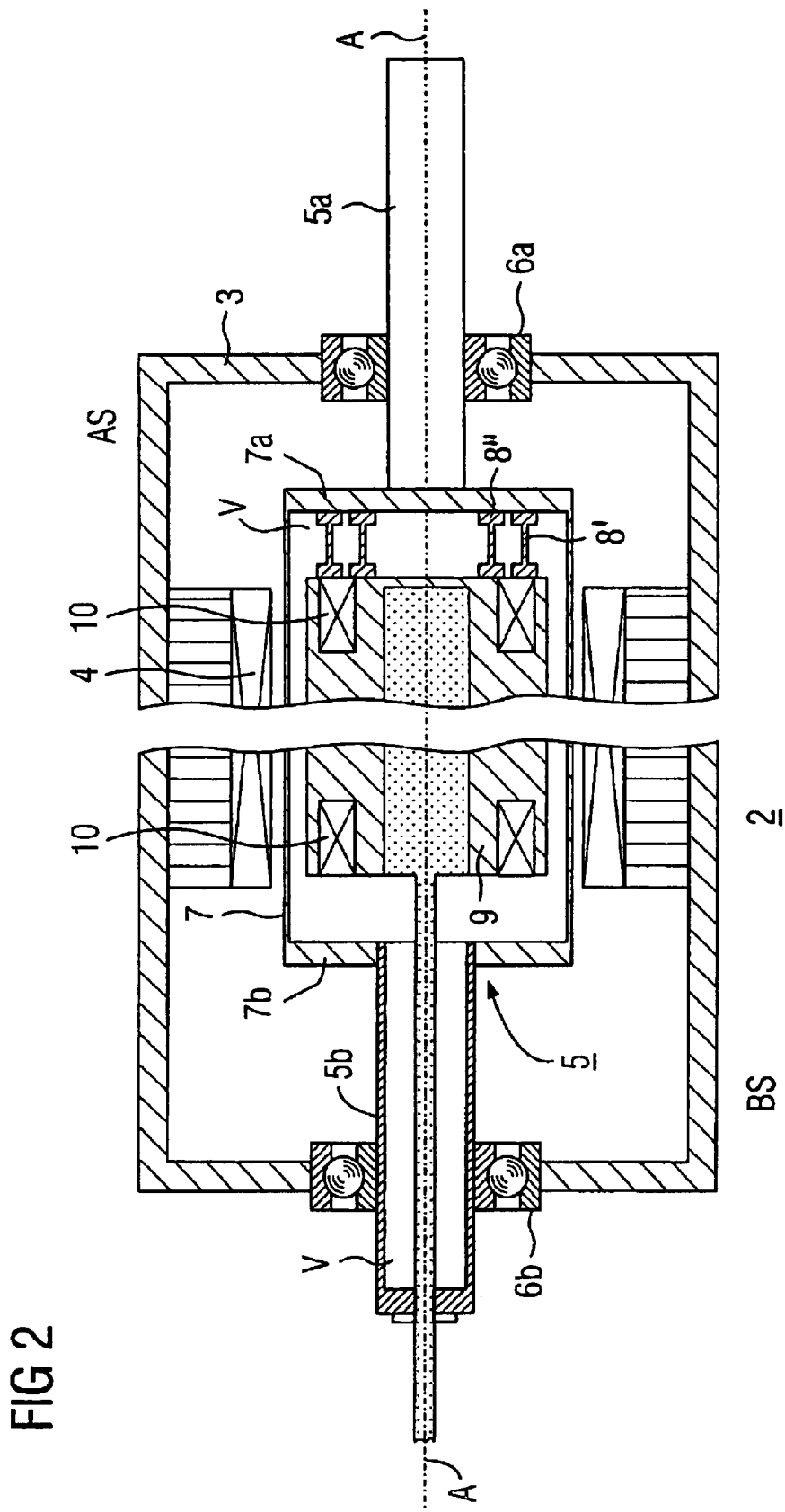
FIG. 2 is a partial cross sectional view of a second possible embodiment of the machine.

In contrast to the embodiment of the attachment apparatus 8 as illustrated in the FIG. 1 and which is in the form of a hollow cylinder, this apparatus may, of course, also be formed from two or more parts. Corresponding elements can thus be formed, for example in the form of two or more concentrically enclosing tubes 8' and 8'' as illustrated in FIG. 2.

Furthermore, as is shown in FIG. 1, the machine according to the invention also does not need to be arranged such that its rotation axis A runs horizontally. In fact, bearing in mind possible unbalance problems, it may be advantageous for its rotation axis A to be aligned in the vertical direction. The winding former 9 would then be suspended by the attachment apparatus 8 within the rotor outer housing 7 and thus on the shaft part 5*a*.

The invention has been described in detail with particular reference to preferred embodiments thereof and examples, but it will be understood that variations and modifications can be effected within the spirit and scope of the invention.

What is claimed is:

1. A machine, comprising:
   a rotor rotatably mounted for rotation about a rotation axis and having axial rotor shaft parts;
   a hot rotor outer housing, attached to the axial rotor shaft parts, having a superconducting winding surrounding a cold winding former;
   a discrete single-ended attachment apparatus, having a hollow cylindrical shape, extending parallel to the rotation axis at an axial end of the rotor that transmits torque, formed of a material conducting heat poorly, holding and centering exclusively the cold winding former within said hot rotor outer housing by transmitting a torque between the cold winding former and an adjacent rotor shaft part; and
   a cooling and thermal insulating system for the superconducting winding.

2. The machine as claimed in claim 1, wherein said single-ended extending attachment apparatus has at least two elements concentrically surrounding the rotation axis.

3. The machine as claimed in claim 1, wherein at least a part of said single-ended extending attachment apparatus is formed from a plastic material reinforced with fibers.

4. The machine as claimed in claim 1, wherein the superconducting winding has conductors containing metallic low-$T_c$ superconductor material or metal-oxide high-$T_c$ superconductor material.

5. The machine as claimed in claim 1, wherein said hot rotor outer housing encloses a vacuum area around the winding former.

6. The machine as claimed in claim 1, wherein the rotation axis of the rotor is aligned vertically.

* * * * *